March 28, 1961  J. R. HUBER  2,976,955
VELOCITY CONTROL MECHANISM FOR ROPE DEVICE
Filed June 16, 1958
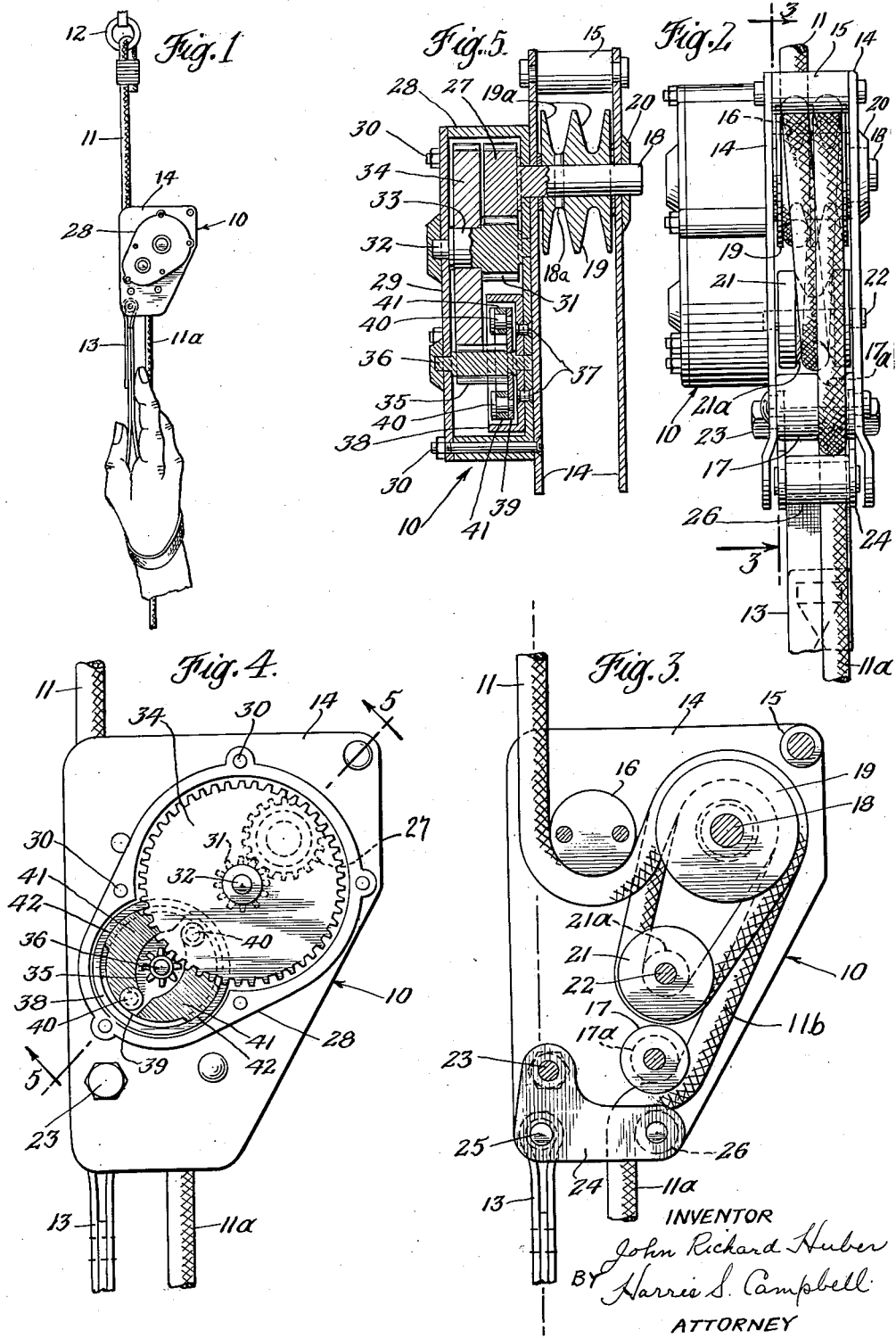
INVENTOR
John Richard Huber
BY Harris S. Campbell
ATTORNEY

United States Patent Office 2,976,955
Patented Mar. 28, 1961

2,976,955

VELOCITY CONTROL MECHANISM FOR ROPE DEVICE

John Richard Huber, Holicong, Pa., assignor to Eastern Rotorcraft Corporation, Doylestown, Pa., a corporation of Pennsylvania Filed June 16, 1958, Ser. No. 742,298

4 Claims. (Cl. 188—65.1)

This invention relates to devices for controlled movement relative to a rope and is particularly concerned with mechanism for controlling the velocity of rope travel through such devices.

Devices for lowering a load with a rope are useful for many purposes. For example such equipment may be used for the escape of occupants from an aircraft after a crash landing where the exit may be located some distance from the ground. Other uses for equipment of this nature are for emergency escape from buildings, for lowering loads to inaccessible places from a hovering helicopter, or for rapid delivery of rescue or fire fighting personnel and equipment from a helicopter at the scene of an aircraft accident while the helicopter remains hovering to direct operations or to divert flames with the rotor downwash.

With most types of rope lowering devices it is necessary to provide a manually controlled braking device in order to control the rate of descent. It is more desirable to have an automatic control in order to eliminate the possibility of excessive speed which might develop from unskilled operation or poor judgment. Mechanism for automatic speed control based upon the rope friction is sensitive to changes in the rope characteristics. Thus variation in material from which the rope is made or the presence of dirt or moisture will cause changes in speed control forces.

It is an object of the present invention to provide a speed control device for a rope which is governed by the rate of travel relative to the rope. Mechanism of this nature provides for increased restraint with increased speed of travel and decreased restraint with decreased speed of travel. Because the restraint varies as the square of the velocity a relatively large difference in the weight or force may be controlled by a small change in speed.

One of the more important objects of the invention is the provision of rope engaging mechanism which will transmit the motion of the rope to the speed control mechanism without appreciable slippage.

A further object of the invention is the provision of highly compact centrifugal brake mechanism with light weight transmission to provide a unit of small size and low weight.

How the foregoing objects and advantages of the invention are accomplished will be clear from the following description of the drawing in which—

Figure 1 illustrates apparatus according to the present invention mounted in operating position on a rope.

Figure 2 shows a side elevational view of the load supporting and speed controlling portion of the apparatus.

Figure 3 is a sectional view taken in the direction of arrows 3—3, Figure 2.

Figure 4 is a sectional view taken in the direction of arrows 4—4, Figure 2, showing the speed control mechanism.

Figure 5 is a sectional view taken in the direction of arrows 5—5, Figure 4.

In Figure 1 a rope engaging and control device 10 is shown in position on a rope 11 anchored to a supporting ring 12. As illustrated the device 10 may support the weight of a person or other load by means of a connection such as a strap 13 which as illustrated is proportioned to pass around the user's wrist. The free hanging or unloaded portion of the rope is shown at 11a.

Figures 2 to 5 show the details of construction of the device 10 to an enlarged scale. The frame incorporates side plate members 14 which are held in properly spaced relationship by a spacer 15, drum member 16 and grooved guide cylinder 17. Rotationally supported in the frame members 14 is a shaft 18 to which is attached the double grooved pulley 19 by means of pin 18a. The plates 14 may be reinforced where necessary to provide the desired bearing characteristics by means of suitable bosses 20. Another pulley 21 has a single groove 21a midway between the planes of the double grooves 19a of pulley 19. Pulley 21 is supported on axle member 22 which extends into the frame plates 14. As will be seen from Figure 3 the pulley 19 is located in the upper portion of the frame and the pulley 21 is located diagonally below pulley 19. The guide cylinder 17 is supported somewhat lower than the pulley 21 and preferably incorporates a guide groove 17a which is located generally in the plane of one of the grooves 19a of the double groove pulley 19.

To support the load between the frame plates 14 a bolt member 23 provides a pivot for a small frame 24. The frame 24 carries the load carrying member 13 by means of a pin 25. Pin 25 is offset slightly to one side of the bolt pivot member 23 and at the opposite end of frame 24 from the pin 25 a cylindrical pressure member 26 is supported so that it is located close to the guide cylinder 17.

As will be clearly seen from Figure 3 this arrangement of frame with the various parts mounted between the plates provides for guiding the rope 11 under the drum 16, over the pulley 19 in one of the grooves for approximately 180 degrees, around pulley 21 approximately 180 degrees, back over pulley 19 in the other groove approximately 180 degrees and then down under the guide cylinder 17 where it can be contacted by the pressure member 26. The unloaded end of the rope then extends out of the frame at 11a. The load on strap 13 applies a small moment about the bolt pivot 23 to produce a slight restraint load at the pressure member 26. This restraint is sufficient to produce a slight load in the portion 11b of the rope which extends from the guide 17 to the pulley 19.

From Figure 5 it will be seen that the shaft 18 is directly connected to a gear 27. A transmission housing 28 having a lid 29 is supported from one of the frame plates 14 by screws 30. Gear 27 meshes with a small gear 31 which is supported in the housing 28 and the cover 29 by axle trunnions 32. A shaft extension 33 connected to gear 31 supports a large diameter gear 34 which in turn meshes with a small gear 35 supported by axle trunnions 36.

Supported on the housing 28 by means of rivets 37 is a brake drum 38. A disk member 39 is directly connected to the gear 35 so that it rotates therewith. Connected to the disk member 39 by means of pivot elements 40 are brake shoes 41. In the brake shown two brake shoes are used with contact surfaces 42 arranged to engage the inside of the drum 38.

With the construction described above the movement of the device with respect to the rope produces a substantially non-slipping drive to give an effective speed control. The slight frictional load produced by the pressure element 26 assures that the rope will be maintained in the groove of pulley 19. The two turns of 180 degrees each around the pulley 19 together with the tapered sides of the pulley grooves gives the relatively non-slipping driving action between the rope and the pulley and thus positively drives the shaft 18. The use of the guide drums 16 in the relative position shown not only provides for increased wrap around the pulley 19 but also removes a portion of the energy directly from the rope to the frame. For example this proportion of frictional energy dissipated through the drum 16 may be of the order of 20 percent of the total energy dissipation. The exact amount will depend upon the frictional characteristics of the rope being used.

The gear drive to the centrifugal control brake produces a step-up in speed of approximately 10 to 1. At this speed the centrifugal forces on the brake shoes are accentuated to give a braking moment which is multiplied approximately 10 times when applied to the pulley shaft 18. Thus at a speed of movement along the rope of 8 feet per second for example, the rotational velocity at the brake shoes will be extremely high amounting to speeds of the order of 12,000 r.p.m. The weight of the brake shoes is selected to produce a braking action which will control the motion of a weight of say 200 pounds to a maximum speed of 8 feet per second. Since the braking action varies as the square of the velocity a considerable change in weight will cause only a small change in speed. For example changing the weight from 200 pounds to 125 pounds would result in a stabilized speed for the 125 pounds weight of approximately 6.8 feet per second instead of 8 feet per second. Likewise an increase in weight to 250 pounds would require a speed of 8.6 feet per second to stabilize. All of these speeds are well within the permissible ground contact speed by a person and are roughly equivalent to a jump of 2 or 3 feet. The examples illustrate operating characteristics only. It will be obvious that the non-slip mechanism functions in exactly the same manner to dissipate energy when the device moves with respect to the rope or when the rope moves with respect to the device.

It will be noted in Figure 4 that the brake shoe 41 is shaped so that its effective weight will be applied at the contacting surface. Increased effectiveness may be obtained by moving the contacting surface closer to the pivot point 40 thus giving a mechanical advantage to the application of the centrifugal force.

From the foregoing it will be evident that I have provided an improved form of device for controlled movement relative to a rope which is particularly useful for lowering articles to the ground from a considerable height. The use of the combination double groove drive pulley with the single groove guide pulley gives an effective non-slipping drive between the rope and the drive shaft so that a positive control of velocity can be accomplished. The general location of the guide members cooperate to provide increased angular contact between the rope and the drive pulley. The use of a slight drag force on the free end of the rope supplied by a portion of the load assures proper contact of the rope with the drive pulley and at the same time prevents excessive frictional contact which might cause malfunction. By the use of compact step-up gearing the necessary speed control can be accomplished within a confined space and with a minimum weight.

I claim:

1. A device for engaging a rope and controlling its movement with respect thereto, said device having a frame from one edge of which the loaded end of the rope extends, a rotatable shaft supported near said edge of the frame and having a double grooved pulley connected thereto, a second shaft rotatably supported on said frame, further from said edge than said first shaft in parallel relationship to said first shaft having a single grooved pulley connected thereto, a rope guide of cylindrical configuration attached to said frame alongside said first shaft at approximately the same distance from said frame edge as said double pulley and located to approximately reverse the direction of a rope extending from the double grooved pulley around said guide, a third shaft supported in said frame parallel to and displaced from said first shaft, a centrifugal brake mechanism attached to said third shaft, step-up gearing between said first shaft and said third shaft, load transfer means attached to said frame at a point near the end opposite said rope guide and a rope engaging element for deflecting the unloaded end of the rope and applying a slight pressure thereon, said element being located on said frame further from said edge than said double pulley, the location of said rope guide, double pulley, single pulley and engaging element thereby providing for guiding the rope from the loaded end around said guide, then over one of said double pulley grooves approximately 180 degrees, thence around said single groove pulley approximately 180 degrees, back over the other groove of the double pulley approximately 180 degrees, then to the rope engaging element, the unloaded end of the rope extending out of said frame at a point remote from the edge from which the loaded end extends.

2. A rope engaging device for controlling relative movement of said device with respect to a rope, said device including a frame, one edge of said frame being defined as being the edge from which the loaded portion of the rope extends, a double grooved pulley, an axle mounted in said frame to rotationally support said double grooved pulley therein, a single grooved pulley, a second axle mounted in said frame to rotationally support said single grooved pulley, speed control mechanism mounted on said frame and connected to be driven by said double grooved pulley, a rope guide supported in said frame, the axis of said double pulley being spaced inwardly from said frame edge a distance greater than the radius of said double pulley, the axis of said guide being located at least as far from said frame edge as the axis of said double pulley, the axis of said single grooved pulley being located farther from said edge than the axis of said double grooved pulley, thus giving a triangular relationship to the axes of said pulleys and said guide, a rope engaging element to change the direction of the rope, said element being mounted in said frame at a position further from said frame edge than said double pulley thus providing for rope positioning from the loaded portion of the rope around said first rope guide approximately 180 degrees, over said double pulley approximately 180 degrees in one of its groove, then over said single grooved pulley approximately 180 degrees and over said double grooved pulley approximately 180 degrees in the second groove and thence engaging said rope engaging element thus providing for the guiding of the unloaded rope portion from said frame at a point remote from the edge from which the loaded portion of the rope extends.

3. A rope engaging device for controlling relative movement with respect to a rope, said device including a frame, a double grooved pulley, a shaft supporting said pulley on said frame at a point spaced inwardly at least the radius of said pulley from the edge of said frame from which the loaded portion of the rope extends, a single grooved pulley, a second shaft parallel to said first shaft supporting said single grooved pulley in said frame at a point further from said frame edge than said double grooved pulley, speed control mechanism supported on said frame rotatably connected to said first mentioned shaft, a rope guide on said frame adjacent said double grooved pulley located at a position approximately as far as from the frame edge as said double grooved pulley, a second rope guide supported on said frame located at a position further from said frame edge than said double grooved pulley and adjacent said single grooved pulley, positioning of said pulleys and guides thus providing that the rope passes around a portion of said first guide, between said first guide and said double grooved pulley, over one of the grooves of said double pulley, around said single grooved pulley, over the other groove of the double grooved pulley and then extending to said second guide, and a rope engaging element movably supported on said frame and positioned adjacent said second rope guide.

4. A construction in accordance with claim 3 in which a beam part supports said rope engaging element, said beam part being pivotally mounted in said frame, and load transfer structure on said beam part located in offset relationship with respect to said pivoted mounting to move said rope engaging part toward said second rope guide.

References Cited in the file of this patent

UNITED STATES PATENTS

| | | |
|---|---|---|
| 631,968 | Rees | Aug. 29, 1899 |
| 650,325 | Hugh | May 22, 1900 |
| 667,526 | Hugh | Feb. 5, 1901 |
| 864,689 | Redman | Aug. 27, 1907 |
| 1,098,223 | Brown | May 26, 1914 |
| 1,720,823 | Davy | July 16, 1929 |